Jan. 25, 1944.  E. H. KOCHER  2,339,784
LUBRICATION
Filed Aug. 3, 1940  2 Sheets-Sheet 2
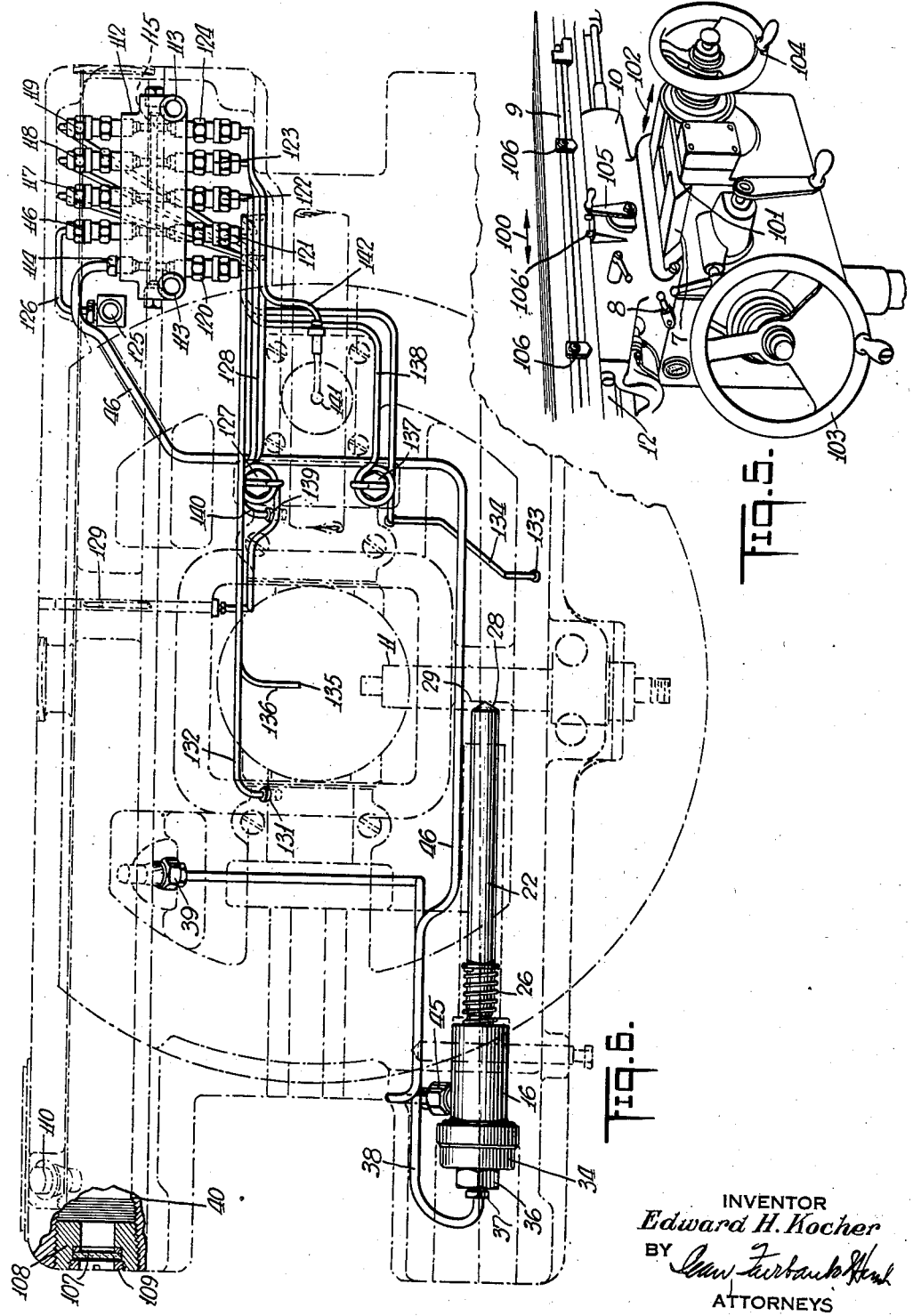
INVENTOR
Edward H. Kocher
BY
ATTORNEYS Patented Jan. 25, 1944

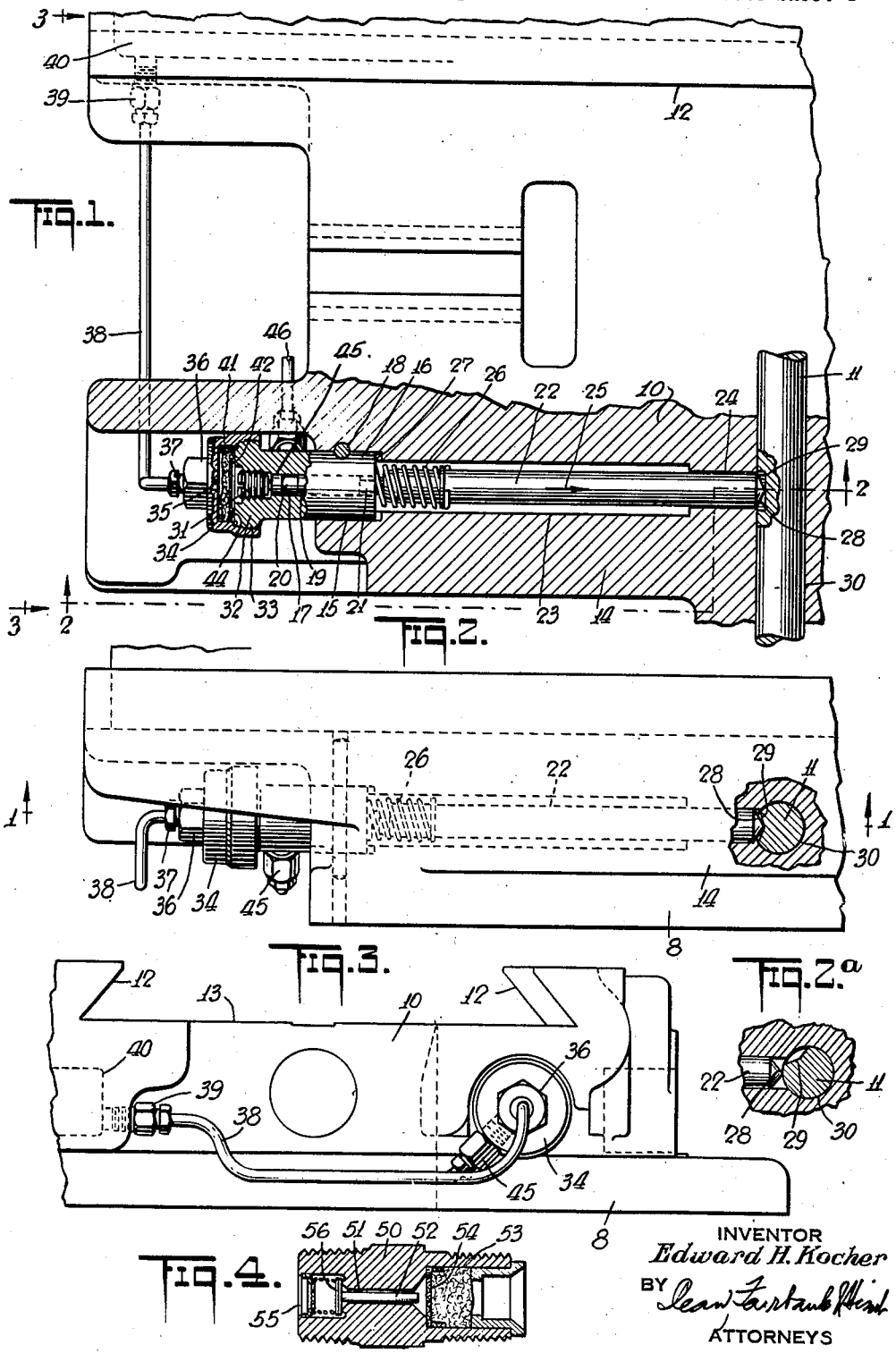

2,339,784

UNITED STATES PATENT OFFICE 2,339,784

LUBRICATION

Edward H. Kocher, Boonton, N. J., assignor to Auto Research Corporation, a corporation of Delaware Application August 3, 1940, Serial No. 350,651

7 Claims. (Cl. 184—6)

The present invention relates to lubricated machine tools, and particularly relates to lubricated machine tools of the type classified as turret lathes and milling machines.

In connection with these machine tools, it is desirable to provide an automatic substantially continuously operating lubricating system which will function as part of the machine to supply lubricant to the various sliding bearings on the mechanism throughout operation thereof, and it is among the objects of the present invention to provide a simple, inexpensive, readily assembled, automatic continuous lubricating system for such machine tools, and particularly for milling machines which will supply relatively small yet accurately proportioned quantities of lubricant to the bearings to be lubricated throughout operation of the machine tool.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most desirable to utilize a recess in and about the mechanism, either upon the bed of the mechanism or in the rotating or sliding part of the mechanism, to carry a pump unit preferably consisting of an unpacked elongated plunger piston pump which is inserted in a recess in the mechanism.

The pump actuator mechanism preferably extends outside of the reservoir, and is operated incidentally to the turning or reciprocation of some manually actuated lever which is operated incidental to initiation of operation of the machine or during the course of operation of the machine.

The pump is provided with an inlet cap having an enclosed strainer and a conduit to feed lubricant to the pump.

In the drawings which show one of the various possible embodiments which may be constructed according to the present invention, but to which the invention should not be restricted, since this embodiment is merely illustrative, Figs. 1 to 3 illustrate one installation according to the present invention, as applied to a universal milling machine; Fig. 1 being a plan view in partial section of the pump and actuator construction upon the line 1—1 of Fig. 2; and Fig. 2 being a side elevation in partial section upon the line 2—2 of Fig. 1; Fig. 2ª is a detailed fragmental sectional view showing the pump plunger in operative position and Fig. 3 being an end view taken from the line 3—3 of Fig. 1;

Fig. 4 is a longitudinal sectional view of one type of flow metering unit that may be employed;

Fig. 5 is a perspective view of one side of the milling machine showing the reciprocatory table and saddle and the mounting of the pump and pump actuating shaft upon said saddle; and Fig. 6 is a plan view of the table and saddle showing the lubricant distributing installation applied thereto.

Referring to Figs. 1 to 3, there is shown a milling machine having a saddle 10 which moves horizontally and which is provided with a table 9 having a traverse motion. The saddle 10 is provided with the base 8 which rides upon the bed of the machine.

This table is actuated through a rotating lever 11 controlling the traverse motion of the table. The table rests between the oblique faces 12 of the saddle 10 and upon the lower face 13 of the recess of such saddle.

One side 14 of the saddle 10 is recessed, as indicated at 15, to receive the press fitted body 16 of the pump which is provided with a bore or cylinder 17.

The body 16 is held in position by the pin 18. The bore 17 receives the plunger 19 having a reduced end portion 20, which plunger has a connection at 21 to the connecting rod 22. The rod 22 extends to a chamber or bore 23 of one side of the saddle or knee and has a bearing at 24.

The connecting rod 22 is biased in the direction 25 by the coil spring 26 which reacts against the face 27 of the body 16.

The end of the connecting rod 22 is provided with a mount 28 which is received in the recess 29 of the table traversing control lever 11 at the end of the charge stroke. This lever rotates within the bearing or recess 30 in which it is received.

The end of the bore 17 is enlarged and receives inlet ball unit 31.

The end of the pump body is enlarged as indicated at 32 and threaded as indicated at 33 to receive the cap 34 which has a central opening 35 serving as an inlet. The inlet is connected through the nut 36 and the coupling 37 to the inlet tube or pipe 38, connected by the coupling connection 39 to a lubricant reservoir at 40.

In the base of the cap 34 is pressed the felt strainer 41 and the screen backing discs 42, which are pressed against the face 44 of the enlarged portion of the body 16.

As the lever 11 is rotated, the lubricant will be fed out through the outlet ball check connection 45 to the tubing 46 leading to the bearings of the mechanism to be lubricated.

The lubricating metering fitting shown in Fig. 4 may be fed from the outlet connection 46 of Fig. 3. The body 50 of the fitting is provided with a small bore 51, substantially completely filled by a pin 52 which forms a narrow annular crevice of the order of one to several thousandths of an inch, which has a substantially greater restricting effect than the tubing of a bearing of the lubricant distributing system.

The inlet socket 53 is provided with the strainer 54, while the outlet socket 55 is provided with the check valve 56.

These fittings 50 will assure proper proportionment and distribution of lubricant among the various bearings of the milling machine to be lubricated.

In Fig. 5, the table 9 is shown in perspective as supported upon the saddle 10 which, in turn, is supported upon the knee or bed 7. The ways 12 of the table 9 and the saddle 10 permit reciprocation in a direction 100, while the ways 101, between the bed 7 and the base 8 of the saddle 10, permit reciprocation as indicated by the arrows 102. The hand wheels 103 and 104 permit ready control of the mechanism while the handle 105 controls the shaft 11 which is connected with the reversing mechanism.

The upper ends of plungers 106' are in the path of the lugs 106 for actuation thereby through a transmission (not shown) to turn shaft 11 between the positions shown in Figs. 2 and 2a and cause reciprocation of the connecting rod 22 and the piston 19.

As shown in Fig. 6, the reservoir 40 is provided with the sight glasses 107, held in position in the threaded insert 108 by the threaded ring 109. The reservoir may be filled through the filling opening 110. The outlet connection 46 leads to the junction 112 having the bolt holes 113 which enable the junction 112 to be connected to the saddle 10. The tube 46 is connected to the junction 112 by the coupling connection 114 feeding the axial bore 115. The axial bore 115 discharges to the flow metering units 116, 117, 118, 119, 120, 121, 122, 123, 124, which are of the construction shown in Fig. 4.

The flow metering fitting 116 supplies lubricant to the bearing 125 by the tube 126. The flow metering fitting 117 supplies lubricant to the bearing 127 through the tube 128. The flow metering fitting 118 supplies lubricant to the bore 129, which bore 129 feeds one side of the ways of the table 9 upon the saddle 10.

The flow metering fitting 119 feeds the bearing 131 by the tube 132.

The flow metering fitting 120 feeds the bearing 133 by the tube 134.

The flow metering fitting 121 feeds lubricant to the drip 135 at the end of the tube 136.

The flow metering fitting 122 feeds lubricant to the bearing 137 by the tube 138.

The flow metering fitting 123 feeds lubricant to the bearing at 139 by the tube 140.

The flow metering fitting 124 feeds oil to the bore 141 by the tube 142.

By this lubricating system with actuation of the pump piston 19 upon movement of the table reversing lever, lubricant will be therefore supplied from the reservoir 40 in the saddle to the table driving mechanism, the table ways and the bearing surfaces at the top of the saddle, all as appears in Fig. 6.

It will be understood that many changes could be made in the particular features of milling machine as shown, and many apparently widely different embodiments of this invention could be made without departing from the scope thereof and it is intended that all matter contained in the above description shall be interpreted as illustrative and not in a limiting sense.

What is claimed is:

1. In a centralized lubricated machine tool construction, a base having an elongated recess therein, a cylindrical pump body received in said recess, an elongated plunger fitted in an axial bore in said body, tapped sockets at the end of said body and at the side of said body communicating with said bore, the first tapped socket being plugged with a threaded inlet check valve unit and the latter tapped socket being plugged by an outlet valve check unit, the inlet end of said pump body being enlarged and threaded, a threaded cap fitted over said body carrying a strainer member and an inlet connection to said cap.

2. A central lubricating pump for a machine tool, comprising a body to be fitted into a recess in the machine tool the end of which body is to project beyond the recess in the machine tool, said body having a central axial bore receiving an elongated unpacked piston plunger, an inlet check valve plugging the end of said bore, a cap carrying an inlet filter covering the end of said body, said plunger extending beyond said body and a connecting rod engaging the projecting end of said plunger and carrying a coil spring reacting at one end against said body and at the other end against said connecting rod.

3. A central lubricant pump for insertion in an elongated socket in a mechanism to be lubricated, said socket having an actuating member extending across the inner end thereof, said pump comprising an elongated cylindrical pump body to be closely fitted into said socket, said body having a central axial bore and an enlarged threaded end portion to project beyond said socket, said bore receiving an elongated unpacked piston plunger projecting beyond said body, an axially aligned connecting rod engaging the end of said plunger and projecting to said actuating member, a coil spring encircling connecting rod and reacting against said body at one end and connected to said connecting rod at its other end and an inlet cap screwed onto said enlarged threaded end portion carrying an inlet tubing connection.

4. For use in a machine tool having a cylindrical socket opening onto a movable part of said tool and a lubricant reservoir separated therefrom, an elongated cylindrical pump body to be closely fitted into said socket, said pump body having a central axial bore containing an elongated unpacked piston plunger, the inside end of said body having an actuating connection to said part and the outside end of said body receiving an inlet cap and a connection from said reservoir to said cap.

5. The pump of claim 4, said cap including a filter and enclosing an inlet check valve positioned at the end of said bore.

6. The pump of claim 4, said actuating connection consisting of an elongated rod having a return spring encircling the rod reacting at one end against said pump body, and at the other end against a collar on said connecting rod.

7. The pump of claim 4, the side of said body having a transverse groove and a pin fitting into said groove to hold said pump body in said position in said cylindrical socket.

EDWARD H. KOCHER.